United States Patent Office 3,712,906
Patented Jan. 23, 1973

3,712,906
DERIVATIVES OF 4-(AMINOETHANE-SULFONYL-AMINO)-ANTIPYRINE
Shun-Ichi Naito, 35 Murasakino Kamitorida-cho, Kyoto, Japan
No Drawing. Continuation-in-part of application Ser. No. 778,792, Nov. 25, 1968. This application Feb. 10, 1969, Ser. No. 798,184
Int. Cl. C07d 49/16
U.S. Cl. 260—294.8 F          13 Claims

ABSTRACT OF THE DISCLOSURE

Analgesic-antipyretic compounds are provided which are derivatives of 4-(aminoethanesulfonylamino)-antipyrine and aminoethanesulfonyl-p-phenetidine of the formula:

$$Z-NHSO_2CH_2CH_2N\begin{smallmatrix}R^1\\R^2\end{smallmatrix}$$

wherein Z is 4-antipyryl or p-ethoxyphenyl and $R^1$ and $R^2$ are each hydrogen, alkyl or acyl. Intermediates and administrable compositions are disclosed. The compounds form stable aqueous solutions retaining practically full activity.

---

This application is a continuation-in-part of Ser. No. 778,792 filed Nov. 25, 1968, now abandoned.

The present invention relates to 4-(aminoethanesulfonylamino)-antipyrine and aminoethanesulfonyl-p-phenetidine derivatives represented by the following formula:

$$Z-NHSO_2CH_2CH_2N\begin{smallmatrix}R^1\\R^2\end{smallmatrix} \quad (1)$$

wherein Z is the 4-antipyryl group, that is

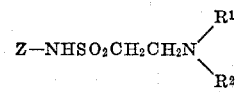

or the p-ethoxyphenyl group, that is

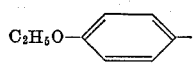

and $R^1$ and $R^2$ are each hydrogen, alkyl or acyl, and to intermediates for said derivatives. The acyl group may be divalent acyl, for example, phthalyl.

The compounds that are obtained in the present invention are previously unreported and are useful as medicinals and, for example, are put into dosage or administrable form with a solid or liquid carrier or vehicle. For example, the compound in which Z is 4-antipyryl in the Formula I (designated Ia hereinafter) is useful as an analgesic. This substance (Ia) has a structure made by the combination of 4-aminoantipyrine, in itself a useful analgesic with little toxicity, and taurine, an essential amino acid with surface activity, and upon administration in man it reveals such a characteristic property that acetylation and other detoxication mechanism in the living organisms do not lower its efficacy. While it is readily soluble in water it is stable against moisture. The aqueous solution is also so extremely stable that leaving 10% solution for 18 months still remains 99.8% of the activity unchanged.

The compounds (I) in which Z is p-ethoxyphenyl (Ib hereafter) are useful as analgesics-antipyretics. Having a structure similar to phenacetin, a useful analgesic-anti-pyretic in itself, combined with taurine, an essential amino acid with surface activity, Ib exerts an excellent effect. The salt of Ib, for example, hydrochloride, has large solubility in water and so its utility is larger. In addition, Ib is extremely stable against moisture and temperature, and even its aqueous solution is stable over a long period of storage. Its toxicity is small.

The compounds (I) of the present invention may be manufactured by a number of different processes. For the manufacture of Ia in which $R^1=R^2=H$, namely 4-(aminoethanesulfonylamino)-antipyrine, 4-(acylamino-ethanesulfonylamino)-antipyrine (II) is hydrolyzed. This reaction may be shown as follows:

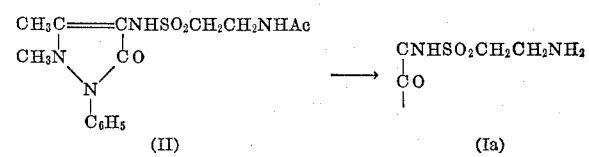

wherein Ac is acyl. When the acyl is divalent, the vicinal NH is naturally N.

The starting substance (II) of this process is also a novel compound and it may be manufactured, for example, by the reaction of 4-aminoantipyrine and acylamino-ethanesulfonyl halide.

As the acyl group in the starting substance (II) of this process, acetyl, propionyl and other aliphatic acyls as well as benzoyl, phthalyl, nicotinoyl and other aromatic acyls may be employed with advantage. These are mentioned only as examples since the present invention is not limited to these acyl groups only.

For the hydrolysis such known procedures as utilizing acid, metallic sodium (sodium alcoholate), alkali and others, may all be employed with advantage. In particular, utilization of concentrated solutions of alkali hydroxide, for example, NaOH and KOH, is desirable in the present invention.

Below are given non-limitative examples for a more detailed explanation of the present invention and in which temperatures are expressed in ° C.

EXAMPLE 1

To 5 g. of 4-(phthalimidoethanesulfonylamino)-antipyrine was added 40 ml. of 30% (w./v.) solution of sodium hydroxide and the mixture refluxed for 3–5 hours. After cooling, it was acidified with concentrated hydrochloric acid, under ice chilling, and then made slightly alkaline with a sodium carbonate solution. The crystalline product that was separated during this procedure was collected and preserved. The filtrate was extracted with ethyl acetate, the ester layer taken, the solvent evaporated off, and the residue combined with the above crystalline product to be recrystallized repeatedly from a small amount of water. There was obtained 3 g. of colorless needles; M.P. 185° (decomp.). Molecular formula: $C_{13}H_{18}O_3N_4S$; molecular weight 310.385.

*Elementary analysis.*—Calculated (percent): C, 50.31; H, 5.85; N, 18.05. Found (percent): C, 50.30; H, 5.82; N, 18.10.

In place of 4-(phthalimidoethanesulfonylamino)-antipyrine in the above process, 4-(acetylaminoethanesulfonyl-amino)-antipyrine, 4-(propionylaminoethanesulfonylami-no)-antipyrine, 4-(benzoylaminoethanesulfonylamino)-antipyrine, or 4-(nicotinoylaminoethanesulfonylamino)-antipyrine was employed in a similar hydrolytic treatment to obtain the desired products.

The 4-(aminoethanesulfonylamino)-antipyrine may be derived, if desired, to salts by reaction with different inorganic and organic acids. For example, the fumarate of M.P. 162–166° and flavanate of M.P. 120–122°, may be formed. These salts may also serve for the purification of the desired free amine product.

The compound (Ib, $R^1=R^2=H$), namely aminoethanesulfonyl-p-phenetidine, can be manufactured by a similar process, hydrolysis of acylaminoethanesulfonyl-p-phenetidine (III). The reaction may be represented as follows:

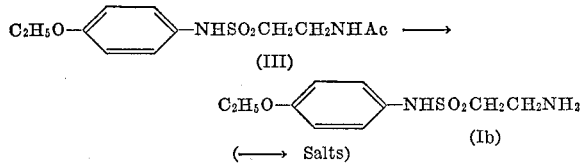

(← Salts)

wherein Ac is acyl. When the acyl group is divalent, the neighboring NH should naturally be N.

The starting substance (III) of the process is also a novel compound and may be manufactured by the reaction of p-phenetidine and acylaminoethanesulfonyl halide.

As the acyl group in III, acetyl, propionyl and other aliphatic acyl groups as well as benzoyl, phthalyl, nicotinoyl and other aromatic acyl groups may be profitably employed. These are mentioned only for explanation and the present invention is not limited only to these acyl groups.

In the hydrolysis involved in the present invention such known hydrolytic processes utilizing acid, metallic sodium (sodium alcoholate), alkali and others may be profitably employed. In particular utilization of concentrated solutions of NaOH or KOH is desirable for the process of the present invention.

EXAMPLE 2

To 17 ml. of a 30% solution of sodium hydroxide was added 2 g. of phthalimidoethanosulfonyl-p-phenetidine and the mixture refluxed for 4–5 hours over a direct flame. After cooling, concentrated hydrochloric acid was added gradually, under chilling, to make the solution slightly acidic. Then sodium carbonate was added in small portions to make the solution alkaline whereupon there was separated a paste which, after leaving overnight, was collected by filtration and repeatedly recrystallized from ethyl acetate to obtain colorless needles of M.P. 149–153°. Yield 1.5 g.

Analysis.—Calculated for $C_{10}H_{16}SO_3N_2$ (percent): C, 49.16; H, 6.60; N, 11.47. Found (percent): C, 49.13; H, 6.62; N, 11.44.

A modification is shown as follows:

To 3 g. of phthalimidoethanesulfonyl-p-phenetidine was added 25 ml. of a 30% solution of sodium hydroxide and the mixture refluxed over a direct flame for 20 minutes. After cooling, the reaction mixture was neutralized with concentrated hydrochloric acid under chilling and then made alkaline by the addition of sodium carbonate to obtain a white lump solid. This was extracted with chloroform, the solvent distilled off, and the residue repeatedly recrystallized from chloroform to obtain colorless needles of M.P. 149–153°. This product showed no depression in the melting point when mixed with the product obtained by the preceding process.

EXAMPLE 3

An example of manufacturing the hydrochloride is given. 5 g. of aminoethanesulfonyl-p-phenetidine that was obtained by the process of the above example was dissolved in 100 ml. of hot ethanol, cooled and to this passed gaseous hydrochloric acid to yield colorless needles, M.P. 175–179°. Yield 4.5 g.

Analysis.—Calculated for $C_{10}H_{17}SO_3N_2Cl$ (percent): N, 9.98%. Found (percent): N, 9.97%.

In place of phthalimidoethanesulfonyl-p-phenetidine in Example 2, acetylaminoethanesulfonyl-p-phenetidine, propionylaminoethanesulfonyl-p-phenetidine, benzoylaminoethanesulfonyl-p-phenetidine, or nicotinoylaminoethanesulfonyl-p-phenetidine may be employed for the similar hydrolytic treatment to manufacture the desired product. The product may also be converted to the succinate, M.P. 117–119° (decomp.), fumarate, M.P. 196–198° (decomp.), flavanate, M.P. 208–211° (decomp.) and other organic acid salts, beside the hydrochloride described above.

In the above compounds, namely Ia and Ib, those with $R^1=R^2=H$ may also be manufactured by another method, hydrazinolysis of the compounds represented by the following formula:

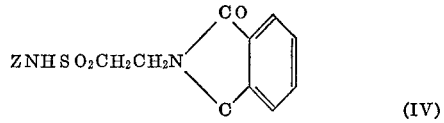

wherein Z has the same meaning given above.

The starting substances (IV) of this process are also novel compounds previously unreported, and may be manufactured, for example, by the reaction of p-phenetidine or 4-aminoantipyrine and phthalimidoethanesulfonyl halide.

In the hydrazinolysis of the present process hydrazine hydrate is employed and it is recommended that the amount be generally equimolar with the starting compounds. The reaction is best conducted in methanol, ethanol or other alcohols with heating.

EXAMPLE 4

To 10 g. of IV (Z=p-ethoxyphenyl) were added 100 ml. of ethanol and 1.3 g. of hydrazine hydrate (approximately 100%) and the mixture refluxed with agitation for 2–3 hours on a water bath. After cooling, the separated phthalic hydrazide was filtered off, the filtrate evaporated under reduced pressure to dryness, the residue extracted with warm methanol, and the extract strongly chilled to remove any solid matter that separated. After distilling off methanol from the filtrate the residue was recrystallized from chloroform; M.P. 149–153°. Yield 2.5 g.

Analysis.—Calculated for $C_{10}H_{16}SO_3N_2$ (percent): C, 49.16; H, 6.60; N, 11.47. Found (percent): C, 49.30; H, 6.51; N, 11.61.

EXAMPLE 5

By using 10 g. of IV (Z=4-antipyryl), a similar process as above was applied (except that the amount of hydrazine hydrate was 11.1 g.) and the substance in the methanolic extract was repeatedly recrystallized from a small amount of water or ethyl acetate. Yield 2.9 g. M.P. 183° (decomp.).

Analysis.—Calculated for $C_{13}H_{18}O_3N_4S$ (percent): C, 50.31; H, 5.85; N, 18.05. Found (percent) C, 50.22; H, 5.93; N, 18.23.

The above is the description of the manufacturing processes of Ia and Ib when $NR^1R^2=NH_2$. Including the cases in which $NR^1R^2=NH_2$, in the cases where $R^1$ and $R^2$ are alkyl or acyl, the products may be manufactured by the following method also.

Firstly, for the compounds of the type Ia, 4-(haloethylsulfonylamino)-antipyrine (Va) may be allowed to react with the compounds represented generally by the formula $R^1NHR^2$. The reaction may be shown as follows:

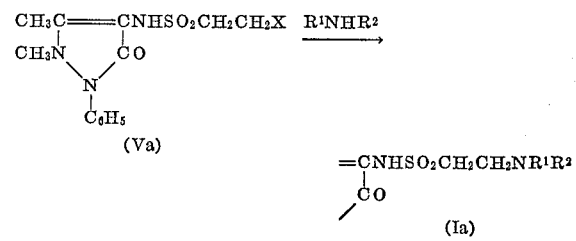

wherein X is halogen, and $R^1$ and $R^2$ are each hydrogen, alkyl or acyl. When the acyl is divalent the neighboring NH becomes N.

The starting substances (Va) of this process are also novel compounds and may be manufactured by the reaction, for example, of 4-aminoantipyrine and haloethylsulfonyl halide.

As the halogen in the starting substance (Va) of the present process, chlorine, bromine and iodine, for example, may be used with advantage, and chlorine is considered the most desirable.

As the amino compounds ($R^1NHR^2$) to be used in the reaction, ammonia, acetamide, propionamide, benzamide, noctinamide, methylamine, dimethylamine, ethylamine, diethylamine, and others may be mentioned. When R is an acyl of two valences (for example phthalyl), $R^1NHR^2$ is naturally shown as RNH and an example is phthalimide. The compounds here mentioned are only for examples for explanation and are not limitation. They can be utilized, as they are, in solution or suspension in water and/or organic solvents. If desired the amine compounds may be used as their acid salts.

The reaction of this process is carried out preferably under pressure where it proceeds more advantageously. NaI, $Cu_2Cl_2$, $NH_4I$ and other catalyzers may also be employed in this case. Concrete and detailed content of the reaction will be described in the following examples. They are provided only as examples for explanation and should not be understood to limit the invention.

EXAMPLE 6

($NR^1R^2=NH_2$)

4-(chloroethanesulfonylamino)-antipyrine was allowed to react with anhydrous ammonia or ammonium carbonate and aqueous ammonia in an autoclave in the presence of a catalyzer to obtain 4-(aminoethanesulfonylamino)-antipyrine (decomposing point 185°). The results under different reaction conditions are shown in the following table. The amount of the starting substance, 4-(chloroethanesulfonylamino)-antipyrine to be used was 10 g. throughout the experiments and the reactions were all done in an autoclave. After the reactions were over, the reaction mixtures were made acidic with hydrochloric acid, the separated precipitate filtered off, the filtrates made slightly alkaline with sodium carbonate, extracted with ethyl acetate, and the extracts evaporated to drive away the solvent. The residues were recrystallized from water to yield the products.

| Ammonia material (g.) | Reaction period (hrs.) | Reaction temperature (°C.) | Yield of 4-(aminoethanesulfonylamino)-antipyrine percent | Catalyzer and amount added |
|---|---|---|---|---|
| Anhyd. $NH_3$, 20 | 2 | 100 | 43 | NaI (0.45 g.). |
| Do | 5 | 100 | 61 | NaI (0.45 g.). |
| Do | 2 | 100 | 76 | $Cu_2Cl_2$ (0.60 g.). |
| Do | 2 | 100 | 48 | $NH_4I$ (0.43 g.). |
| Do | 5 | 100 | 91 | $Cu_2Cl_2$ (1.0 g.). |
| Do | 8 | 100 | 77 | $Cu_2Cl_2$ (0.6 g.). |
| 10 g. $(NH_4)_2CO_3$ was dissolved in 20 ml. aq. ammonia (27%). | 2 | 120 | 86 | $Cu_2Cl_2$ (0.40 g.). |
| Do | 8 | 140 | 90 | $Cu_2Cl_2$ (0.40 g.). |

The reactions proceed in the absence of a catalyzer but the yield was lower. Application of similar procedure on 4-(bromoethanesulfonylamino)-antipyrine and 4-(iodoethanesulfonylamino)-antipyrine also yielded the desired product. The yields were somewhat lower, however.

EXAMPLE 7

($NR^1R^2=$acetylamino)

When acetamide was employed in place of ammonia in the process described in Example 6, 4-(acetylaminoethanesulfonylamino)-antipyrine was similarly obtained. Thus, to 10 g. of acetamide were added 55 g. of 4-(chloroethanesulfonylamino)-antipyrine and 5 g. of $Cu_2Cl_2$ and the mixture was allowed to react for 5 hours at 100° in an autoclave and then 150 ml. of water was added and extracted with ethyl acetate. After the ethyl acetate was distilled off the residue was distilled under reduced pressure to obtain a pale yellow, oily substance.

Analysis.—Calculated for $C_{14}H_{17}O_4N_4S$ (percent): N, 16.61. Found (percent): N, 16.63.

EXAMPLE 8

($NR^1R^2=$nicotinoylamino)

In a similar manner 4-(nicotinoylaminoethanesulfonylamino)-antipyrine was manufactured as follows. To 10 g. of nicotinamide were added 2.6 g. of 4-(chloroethanesulfonylamino)-antipyrine and 2.5 g. of $Cu_2Cl_2$ and the mixture was allowed to react for 5 hours at 100° in an autoclave. After 100 ml. of water was added it was extracted with ethyl acetate. The extract was distilled to drive off ethyl acetate and the residue recrystallized from a large amount of ethanol to yield colorless needles of the hydrochloride of M.P. 238–239° (decomp.). Yield 60%.

EXAMPLE 9

In a similar manner 4-(phthalimidoethanesulfonylamino)-antipyrine was manufactured. Colorless needles, M.P. 177–180°.

EXAMPLE 10

($NR^1R^2=$methylamino)

In the process of Example 6 ammonia was replaced by methylamine to produce 4-(dimethylaminoethanesulfonylamino)-antipyrine by similar procedure. Thus, to 20 g. of methylamine were added 52 g. of 4-(chloroethanesulfonylamino)-antipyrine and 5 g. of $Cu_2Cl_2$ and the mixture was allowed to react for 5 hours at 100° in an autoclave followed by the addition of 150 ml. of water and extraction with ethyl acetate for a long period. After the ethyl acetate was distilled off from the extract, the residue was crystalline but with strong hygroscopicity and so it was crystallized in the form of the fumarate having M.P. of 255° (decomp.), yield 41%.

Analysis.—Calculated for $C_{19}H_{26}O_7N_4S$ (percent): N, 12.33. Found (percent): N, 12.52.

EXAMPLE 11

($NR^1R^2=$diethylamino)

In the process of Example 6 ammonia was replaced by diethylamine to produce 4-(diethylaminoethanesulfonylamino)-antipyrine by the similar procedure. Thus, to 15 g. of diethylamine were added 50 g. of 4-(chloroethanesulfonylamino)-antipyrine and 5 g. of $Cu_2Cl_2$ and the mixture was allowed to react for 5 hours at 100° in an autoclave followed by the addition of 100 ml. of water and extraction with ethyl acetate for a long period. The residue after evaporating ethyl acetate was crystalline but with strong hygroscopicity and so it was crystallized as the form of fumarate. The fumarate had an M.P. of 259° (decomp.), yield 40%.

Analysis.—Calculated for $C_{21}H_{30}O_7N_4S$ (percent): N, 11.61. Found (percent): N, 11.59.

In a similar manner Ib can be manufactured. Thus, haloethylsulfonyl-p-phenetidine (Vb) is allowed to react with a compound that may be represented by the formula $R^1NHR^2$. The reaction may be shown as follows:

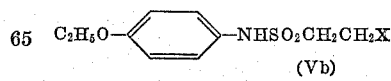

(Vb)

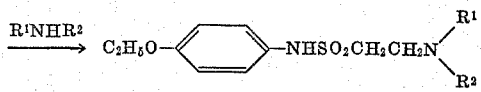

wherein X is halogen and $R^1$ and $R^2$ are each hydrogen, alkyl or acyl. When the acyl group is divalent, a hydrogen combining to the nitrogen atom neighboring to the acyl is removed.

The starting substance (Vb) of the present process is also novel and not reported previously and may be manufactured, for example, by the reaction of p-phenetidine and haloethylsulfonyl halide. As the halogen contained in Vb such as chlorine, bromine, and iodine are useful, in particular chlorine.

As the amino compound ($R^1NHR^2$) to be employed for the reaction, ammonia, acetamide, propionamide, benzamide, nicotinamide, methylamine, ethylamine, dimethylamine, and diethylamine may be mentioned as examples. When R is divalent acyl (for example phthalyl), $R^1NHR^2$ is RNH, and the example is phthalimide. These are examples only for explanation and do not limit the invention. These compounds can be utilized as they are or in solution or suspension in water and/or organic solvents. If desired, they may be used as acid salts.

The reaction of this process advantageously proceeds preferably under pressure. In this case NaI, $Cu_2Cl_2$, $NH_4I$ and other catalyzers may be employed. Concrete and detailed contents of the reaction may be explained in the following examples which are provided only for explanation and do not limit the invention.

EXAMPLE 12

($NR^1R^2=NH_2$)

Chloroethanesulfonyl-p-phenetidine was allowed to react with anhydrous ammonia or with a mixture of ammonium carbonate and aqueous ammonia in an autoclave in the presence of a catalyzer to obtain aminoethanesulfonyl-p-phenetidine (M.P. 149–153°). The results of the reaction under different conditions are tabulated below. Throughout the experiments, the amount of the starting substance, chloroethanesulfonyl-p-phenetidine, employed was 10 g., the reaction was conducted in an autoclave, and after the reaction was over the reaction solution was made acidic with concentrated hydrochloric acid, then slightly alkaline with sodium carbonate, extracted with chloroform, and the product repeatedly recrystallized from ethyl acetate.

When the aminoethanesulfonyl-p-phenetidine here obtained was dissolved in ethanol and hydrogen chloride gas was passed through the solution there was obtained the hydrochloride as colorless needles of M.P. 175–179°. Similarly obtained were the succinate of M.P. 117–119° (decomp.), fumarate of M.P. 196–198° (decomp.), flavanate of M.P. 208–211° (decomp.) and other salts of organic acids.

| Starting ammonia (g.) | Reaction time (hrs.) | Reaction temperature (° C.) | Yield of aminoethanesulfonyl-p-phenetidine, percent | Catalyzer and amount |
|---|---|---|---|---|
| Anhyd. ammonia, 20 | 2 | 100 | 40 | NaI (0.45 g.). |
| Do | 5 | 100 | 60 | NaI (0.45 g.). |
| Do | 2 | 100 | 75 | $Cu_2Cl_2$ (0.60 g.). |
| Do | 2 | 100 | 45 | $NH_4I$ (0.43 g.). |
| Do | 5 | 100 | 88 | $Cu_2Cl_2$ (1.0 g.). |
| Do | 8 | 100 | 72 | $Cu_2Cl_2$ (0.60 g.). |
| 10 g. $(NH_4)_2CO_3$ was dissolved in 20 ml. 27% aq. ammonia. | 2 | 120 | 85 | $Cu_2Cl_2$ (0.40 g.). |
| Do | 8 | 140 | 88 | $Cu_2Cl_2$ (0.40 g.). |

The above reactions can proceed in the absence of any catalyzer but with lower yield. Bromoethanesulfonyl-p-phenetidine and iodoethanesulfonyl-p-phenetidine also may be employed to manufacture the identical product by the similar procedure, but with somewhat lowered yields.

EXAMPLE 13

($NR^1R^2=$acetylamino)

In place of ammonia in the process of Example 12 acetamide was employed for the similar reaction to obtain acetaminoethanesulfonyl-p-phenetidine. Thus, to 10 g. of acetamide were added 67.5 g. of chloroethanesulfonyl-p-phenetidine and 5 g. of $Cu_2Cl_2$ and the mixture allowed to react for 5 hours at 100° in an autoclave. There was added 150 ml. of water and the mixture extracted with chloroform, the chloroform distilled off, and the residue recrystallized from water to yield needles of M.P. 142–148°. Yield 40%.

EXAMPLE 14

($NR^1R^2=$nicotinoylamino)

In similar manner nicotinoylaminoethanesulfonyl-p-phenetidine can be manufactured. Thus, to 10 g. of nicotinamide were added 25 g. of chloroethanesulfonyl-p-phenetidine and 2.5 g. of $Cu_2Cl_2$ and the mixture allowed to react for 5 hours at 100° in an autoclave. After 100 ml. of water was added it was extracted with chloroform, distilled to drive off the chloroform, and the residue recrystallized from benzene to yield colorless needles, M.P. 67–74°. Yield 51%.

EXAMPLE 15

($NR^1R^2=$phthalimide)

In similar manner phthalimidoethanesulfonyl-p-phenetidine was manufactured. Colorless needles of M.P. 141–144°.

EXAMPLE 16

($NR^1R^2=$diethylamino)

When the ammonia in Example 12 was replaced by diethylamine, diethylaminoethanesulfonyl - p - phenetidine was obtained in similar manner. Thus, to 20 g. of diethylamine were added 10 g. of chloroethylsulfonyl-p-phenetidine and 1 g. of $Cu_2Cl_2$ and the mixture allowed to react for 5 hours at 100° in an autoclave. Then, anhydrous ethanol was added, the mixture filtered, the filtrate evaporated to drive off ethanol, and the residue recrystallized from a small volume of anhydrous ethanol to give a colorless, crystalline powder of M.P. 232–237° (decomp.). This product was strongly hygroscopic. On admixture with the authentic specimen it showed no depression in the melting point. Yield 31.5%.

When $R^1$ is acyl in Ia and Ib they may be manufactured by acylation of the amino compounds, also. For example for Ia, 4-(aminoethanesulfonylamino)-antipyrine is acylated. The reaction may be shown as follows:

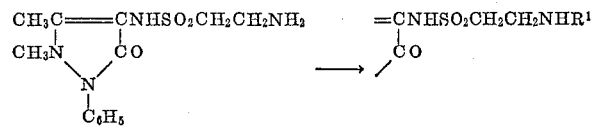

wherein $R^1$ is acyl, and when the acyl is divalent the neighboring NH is N.

The acyl group $R^1$ in the present process includes acetyl, propionyl and other aliphatic acyls, benzoyl, nicotinoyl and other aromatic acyls, and phthalyl and other divalent acyl groups. In case $R^1$ is divalent acyl, the neighboring NH should naturally be N and when it is phthalyl it forms a phthalimido group with the vicinal N.

For the acylation of the present invention various known processes of acylation may be applied. It is desirable to acylate by using an acid or its functional derivative, for example, acid anhydride, ester, acid halide or their mixtures, of the corresponding acyl group. The acids and their functional derivatives may be in the form of salts. The reaction may be conducted, depending on the kind and amount of the reactants, at ordinary or elevated temperatures, and under ordinary or increased pressures. It may also be conducted in a solvent at room temperatures or with heating, or in the presence of a suitable catalyzer.

Below are given examples for more detailed explanation of this phase of the invention. They are provided only for explanation and illustration.

EXAMPLE 17

(R¹=acetyl)

4-(aminoethanesulfonylamino)-antipyrine was allowed to react with glacial acetic acid, acetic anhydride, or acetyl chloride, and after the reaction mixture was neutralized with sodium carbonate it was extracted with ethyl acetate. The solvent was distilled off from the extract and the residue distilled under reduced pressure (18 mm. Hg) to obtain a pale yellow oily substance that distilled at 200–280° of bath temperature.

*Analysis.*—Calculated for $C_{14}H_{17}O_4N_4S$ (percent): N, 16.61. Found (percent): N, 16.59.

EXAMPLE 18

(R¹=nicotinoyl)

To 3 g. of 4-(aminoethanesulfonylamino)-antipyrine dissolved in 8 ml. of pyridine was added 2 g. of nicotinic chloride hydrochloride. After leaving overnight at room temperature, the mixture was distilled under reduced pressure to drive off pyridine to obtain a yellow residue. On recrystallization from a large volume of ethanol it gave 3.5 g. of colorless needles of the hydrochloride of M.P. 238–239° (decomp.). This hydrochloride is treated with sodium carbonate to give a free amine of M.P. 198–201° (decomp.).

*Analysis.*—Calculated for $C_{19}H_{21}O_4N_5S$ (percent): C, 54.97; H, 5.09; N, 16.86. Found (percent): C, 54.94; H, 5.07; N, 16.90.

The hydrochloride is sparingly soluble in ethyl acetate, benzene, acetone and chloroform and soluble in water.

When nicotinic chloride was used in place of nicotinic chloride hydrochloride the yield of the product was not changed.

Use of nicotinic anhydride or nicotinic acid also proceeded similarly as to the reaction. An example of the use of nicotinic anhydride is given as follows:

A mixture of 31 g. of 4-(aminoethanesulfonylamino)-antipyrine (0.1 mole), 22.8 g. (0.1 mole) of nicotinic anhydride, and 65 ml. of anhydrous pyridine, placed in a three-necked flask, was agitated for 5 hours on a boiling water bath. The pyridine was distilled off under reduced pressure and the residue recrystallized from a large volume of ethanol to yield 9.1 g. of colorless crystals of the hydrochloride with M.P. 238–239° (decomp.). It showed no depression of melting point on admixture with the authentic specimen.

An example of use of nicotinic acid is given as follows:

A mixture of 31.0 g. (0.1 mole) of 4-(aminoethanesulfonylamino)-antipyrine, 12.3 g. (0.1 mole) of nicotinic acid, and 380 ml. of p-cymene was placed in a three-necked flask with a moisture-separating tube and heated under agitation at 180–190° (for about 4 hours) allowing to remove azeotropically the water that was formed. After cooling it was distilled under reduced pressure to remove p-cymene and the residue recrystallized from water. Addition of 0.5 g. of concentrated sulfuric acid to this condensation reaction as a catalyzer did not change the yield of the product; in this case, p-cymene was distilled off under reduced pressure and the residue neutralized with pulverized NaHCO₃ before recrystallization from water.

Colorless crystals of M.P. 198–201° (decomp.) were thus obtained in a yield of 8.5 g. This product did not depress the melting point upon admixture with the authentic sample.

Another embodiment where R¹ is nicotinoyl is as follows:

4-(aminoethanesulfonylamino)-antipyrine (3 g.) is dissolved in 8 ml. of anhydrous pyridine, the mixture is kept overnight after addition of 2 g. of nicotinic chloride hydrochloride, and heated for 1 hour on a water bath. After cooling the mixture is adjusted to pH 9 with Na₂CO₃ solution and evaporated to dryness in vacuo. Decolorizing charcoal is added to the residue and recrystallized from water to give 3.6 g. of needles, M.P. 198–201° (decomp.).

This product is easily soluble in chloroform and ethanol but scarcely soluble in ethyl acetate, benzene, and ether.

*Analysis.*—Calculated for $C_{19}H_{21}O_4N_5S$ (percent): C, 54.97; H, 5.09; N, 16.86. Found (percent): C, 54.91; H, 5.11; N, 16.92.

EXAMPLE 19

(Ac=phthalyl)

In a manner similar to the above procedure, 4-(phthalimidoethanesulfonylamino)-antipyrine was manufactured by using phthalic anhydride: colorless needles of M.P. 177–180°.

When R¹ is acyl in Ib it may be manufactured by a similar process, namely acylation of aminoethanesulfonyl-p-phenetidine. The reaction may be shown as follows:

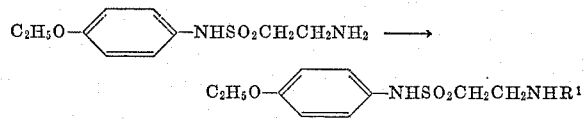

wherein R¹ is acyl, and when it is divalent the adjacent NH becomes N.

R¹ (acyl group) in the present process includes acetyl, propionyl and other aliphatic acyls, benzoyl, nicotinoyl, and other aromatic acyls, and phthalyl and other divalent acyl groups. In case of divalent acyl, the NH vicinal to R¹ will be N, and with the phthalyl group there is formed a phthalimido group together with the N.

Different known processes of acylation may be applied for the acylation reaction of the present invention. It is recommended, for example, to do the acylation by using the acid or its functional derivatives such as acid anhydride, ester, acid halide or their mixture, which corresponds to the acyl group employed. The acid and the functional derivatives may also be in the form of salts. The reaction was conducted, depending on the kind and amount of the reactants, at ordinary temperatures or with heating, at ordinary pressure or under elevated pressure.

Below are given examples for more detailed explanation of the invention. They are examples only and not limitations.

EXAMPLE 20

(R¹=acetyl)

Aminoethanesulfonyl-p-phenetidine was allowed to react with glacial acetic acid, acetic anhydride or acetic chloride, and after neutralizing the reaction mixture with sodium carbonate it was cooled and the separated matter recrystallized from water. For instance, 5 g. of aminoethanesulfonyl-p-phenetidine was dissolved in 10 ml. of warm acetic anhydride and heated for about 10 minutes. After cooling 50 ml. of water was added and the mixture chilled to separate colorless needles which were recrystallized from water to yield 4.5 g. of crystals of M.P. 142–148°.

*Analysis.*—Calculated for $C_{12}H_{18}SO_4N_2$ (percent): N, 9.78. Found (percent): N, 9.80.

EXAMPLE 21

(R¹=nicotinoyl)

To 2.4 g. (0.01 mole) of aminoethanesulfonyl-p-phenetidine were added 8 ml. of pyridine and then 2.0 g. (0.01 mole) of nicotinic chloride hydrochloride. The mixture was heated for 30 minutes and allowed to stand overnight at room temperature. It was distilled under reduced pressure to drive off pyridine and the residue recrystallized repeatedly from benzene to obtain colorless needles of M.P. 69–74°. Yield 1.5 g.

Analysis.—Calculated for $C_{16}H_{19}O_4N_3S$ (percent): C, 53.47; H, 5.33; N, 14.47. Found (percent): C, 53.39; H, 5.30; N, 14.42.

In place of nicotinic chloride hydrochloride, nicotinic chloride could be used with no change in the yield. It was also confirmed that the reaction of nicotinic chloride and aminoethanesulfonyl-p-phenetidine proceeded not only with pyridine as the reaction solvent but also with water or different organic solvents to which a small amount of pyridine has been added with advantage.

For example, to 2.4 g. (0.01 mole) of aminoethanesulfonyl-p-phenetidine was added 30 ml. of ethyl acetate. After the addition of 2.0 ml. (0.011 mole) of nicotinic chloride hydrochloride the mixture was refluxed on a water bath for 1 hour. Distillation off of ethyl acetate from the reaction mixture left a yellow-whitish solid which was dissolved in a minimum volume of water, and made alkaline by adding a saturated solution of sodium hydrogen carbonate to obtain a yellow, oily product. It was chilled to solidify, collected by filtration and recrystallized repeatedly from benzene to yield colorless needles of M.P. 69–74°. Yield 2.0 g.

EXAMPLE 22

($R^1$=phthalyl)

By employing phthalic anhydride, a treatment similar to the above described produced phthalimidoethanesulfonyl-p-phenetidine: colorless needles of M.P. 141–144°.

The embodiments of the invention utilizing nicotinic anhydride and nicotinic acid, in place of nicotinic chloride (hydrochloride) in Example 21, are described in Example 23 and 24, respectively, as follows:

EXAMPLE 23

A mixture of 24.4 g. (0.1 mole) of aminoethanesulfonyl-p-phenetidine, 22.8 g. (0.1 mole) of nicotinic anhydride, and 70 ml. of anhydrous pyridine was placed in a three-necked flask and agitated on a boiling water bath for 5 hours. Under reduced pressure the pyridine was evaporated off and the residue was made alkaline by the addition of a saturated solution of sodium hydrogen carbonate to obtained a yellow oily substance. It was chilled to solidify, collected by filtration and repeatedly recrystallized from benzene to colorless needles of M.P. 69–74°. Upon admixture with the authentic preparation it showed no depression in the melting point. Yield 7.7 g.

EXAMPLE 24

A mixture of 24.4 g. (0.1 mole) of aminoethanesulfonyl-p-phenetidine, 12.3 g. (0.1 mole) of nicotinic acid, and 380 ml. of p-cymene was placed in a three-necked flask with a moisture-separating tube and heated at 180–190° (for about 4 hours) with agitation allowing to remove water that was formed azeotropically. After cooling p-cymene was distilled off under reduced pressure and the residue dissolved in the minimum volume of water and made alkaline by the addition of saturated solution of sodium hydrogen carbonate to obtain a yellow oil. It was chilled to solidify, collected by filtration and recrystallized repeatedly from benzene to yield colorless crystals of M.P. 69–74°. This did not depress the melting point when admixed with the authentic preparation. Yield 8.1 g.

The reaction of the present process may also be conducted in the presence of a catalyzer. The acylaminoethanesulfonyl-p-phenetidines that are obtainable by the present process can be converted to salts, if desired, by reaction with different inorganic and organic acids. For example, such organic acid salts as the fumarate of M.P. 175–177° (decomp.), flavanate of M.P. 210–213° (decomp.) and succinate of M.P. 135–137° of nicotinoyl-aminoethanesulfonyl-p-phenetidine may be formed. These salts are also utilized for the purification of the products.

What is claimed is:

1. A compound selected from the group consisting of an antipyrine derivative of the formula:

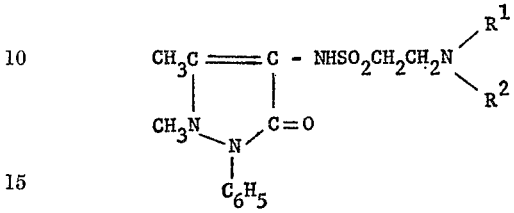

wherein each of:
$R^1$ and $R^2$ when taken independently of the other, is hydrogen, lower alkyl, acetyl, propionyl, benzoyl or nicotinoyl or
$R^1$ and $R^2$ when taken together with the nitrogen atom to which they are attached, are phthalimido and a pharmaceutically acceptable salt thereof.

2. The compound according to claim 1 wherein $R^1$ and $R^2$ taken together with the nitrogen atom to which they are attached are phthalimido.

3. The compound according to claim 1 wherein each of $R^1$ and $R^2$ is hydrogen.

4. The compound according to claim 1 wherein $R^1$ is hydrogen and $R^2$ is methyl.

5. The compound according to claim 1 wherein $R^1$ is hydrogen and $R^2$ is ethyl.

6. The compound according to claim 1 wherein $R^1$ is hydrogen and $R^2$ is acetyl.

7. The compound according to claim 1 wherein $R^1$ is hydrogen and $R^2$ is propionyl.

8. The compound according to claim 1 wherein $R^1$ is hydrogen and $R^2$ is benzoyl.

9. The compound according to claim 1 wherein $R^1$ is hydrogen and $R^2$ is nicotinoyl.

10. The compound according to claim 1 wherein each of $R^1$ and $R^2$ is ethyl.

11. The compound according to claim 1 wherein each of $R^1$ and $R^2$ is methyl.

12. The compound

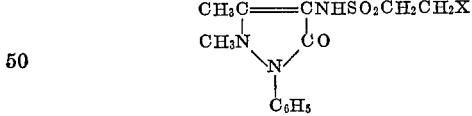

13. The compound according to claim 12 wherein X is chloro.

References Cited

UNITED STATES PATENTS

| | | | |
|---|---|---|---|
| 2,744,912 | 5/1956 | Gailliot et al. | 260—310 A |
| 2,897,206 | 7/1959 | Fukui et al. | 260—310 A |
| 3,004,984 | 10/1961 | Stach et al. | 260—310 A |
| 3,087,933 | 4/1963 | Matter et al. | 260—310 A |
| 3,354,167 | 11/1967 | Klosa | 260—310 A |

HENRY R. JILES, Primary Examiner

S. D. WINTERS, Assistant Examiner

U.S. Cl. X.R.

260—310 A, 556 A, 326 S, 453 R; 424—273, 266, 321, 274